United States Patent [19]

Ell

[11] 3,867,023
[45] Feb. 18, 1975

[54] SEALING APPARATUS FOR A SELF-PROCESSING CASSETTE

[75] Inventor: Robert J. Ell, Malden, Mass.
[73] Assignee: Polaroid Corporation, Cambridge, Mass.
[22] Filed: Feb. 22, 1974
[21] Appl. No.: 444,970

[52] U.S. Cl. .................................. 352/130, 352/72
[51] Int. Cl. ............................................ G03c 11/00
[58] Field of Search .......... 352/72, 130; 354/83, 88, 354/303, 305

[56] References Cited
UNITED STATES PATENTS
3,785,725   1/1974   Batter ............................. 352/130
3,824,007   7/1974   Stella ............................... 352/72

Primary Examiner—Monroe H. Hayes
Attorney, Agent, or Firm—William A. Danchuk

[57] ABSTRACT

A photographic film handling cassette includes a processing station configured to selectively dispense processing fluid to a strip of film following its exposure. A processing initiation assembly is provided within the film handling cassette for initiating the film processing in response to an applied signal. The processing station includes a housing, a receptacle for releasably retaining a quantity of the processing fluid and an aperture formed in the housing for permitting a portion of the processing initiation assembly to pass through the housing and engage the receptacle for causing the subsequent release of the processing fluid in response to the applied signal. A sealing arrangement is provided which is movable from a first aperture sealing position prior to processing initiation to a second aperture sealing position subsequent to processing initiation in response to the initiation of film processing for preventing the egress of processing fluid from the housing through the aperture.

27 Claims, 11 Drawing Figures

PATENTED FEB 18 1975 3,867,023

SEALING APPARATUS FOR A SELF-PROCESSING CASSETTE

BACKGROUND OF THE INVENTION

1. Field of the Invention

This invention relates to photographic film cassettes and more particularly, to a multipurpose film handling cassette having an improved film processing station and sealing arrangement therefor.

2. Description of the Prior Art

The present application is addressed to photographic film cassettes from which the film strip need not be removed during the exposure, processing and projection of the same. Exemplary of such systems are those described in prior U.S. Pat. No. 3,615,127 of Edwin H. Land issued Oct. 26, 1971, and U.S. Pat. No. 3,641,896 of Rogers B. Downey issued Feb. 15, 1972, both of which are owned by the assignee of the present invention. In such systems, a strip of photographic film contained in a cassette can be exposed in a camera adapted to receive the cassette and then processed to provide viewable images by placing the cassette in a viewing apparatus equipped to activate a cassette contained processor upon rewinding the exposed film strip. After processing in this manner, the viewing apparatus is operated as a projector to advance the film incrementally frame-by-frame past a light source so that the scene photographed is reproduced on the film in a manner well known in the motion picture art.

In systems of the aforementioned type, the processing operation after film exposure and before viewing entails the deposition of a uniform coating of processing fluid along the length of the film strip to effect a diffusion transfer of a negative image in a light sensitive emulsion layer on the film strip to a positive image-receiving layer or interface. In one arrangement, similar to that shown in a copending application for patent entitled "Processing Fluid Release Device and Method for Multipurpose Film Cassettes" by Joseph A. Stella et al., Ser. No. 428,377 filed Dec. 26, 1973, the processing fluid supply is contained within an initially closed reservoir or pod housed within a processing station located within the film cassette. The reservoir is configured having a removable peel-tab in covering relationship with a reservoir opening. The reservoir opening is capable of being opened upon activation of the processor by the viewing apparatus to allow the fluid to escape from the pod and pass through a nozzle-like opening to the exposed emulsion layer of the film strip. The peel-tab of the reservoir is connected to a tear-tab configured to pass through an aperture formed in the processing station housing. The other end of the tear-tab is connected to a processing initiation system located exteriorly of the processing station housing. Initiation of processing is achieved by the receipt of an applied signal or operation directed by the viewing apparatus to the processing initiation system of the film handling cassette. Upon such receipt, the processing initiation system is activated to begin movement of the tear-tab to cause the peeling of the peel-tab out of its covering relationship with the reservoir opening. The latter operation results in the release of the processing fluid within the processing station housing so as to be directed by the nozzle to the film strip. During such processing initiation, the tear-tab is separated from the reservoir's peel-tab and removed completely from the processing station housing through the aperture provided therein. Upon removal of the tear-tab from the housing, it is most important to prevent the accidental egress of processing fluid through the aperture to the remainder of the film cassette where it would cause irreparable damage due to the self-contained nature of the cassette.

SUMMARY OF THE INVENTION

In accordance with the present invention, an improved multipurpose film cassette is provided particularly for use in motion picture photographic systems of the type noted above and which requires no viewer mounted or other external means for effecting a release of processing fluid from an initially sealed storage reservoir to initiate a processing cycle automatically upon a rewind operation of the film strip after exposure in the cassette. The release of processing fluid from the reservoir is effected by a pull-tab extension connected at one end to a peel-tab of the reservoir in covering relationship with a reservoir release opening and at its other end to a processing initiation assembly located exteriorly of the processing station housing which contains the reservoir. In its connection between the peel-tab of the reservoir and the processing initiation assembly, the tear-tab passes through an aperture formed in the processing station housing. Upon initiation of processing, due to the receipt of an applied signal by the processing initiation assembly, the tear-tab is withdrawn from the processing station housing through the aperture provided therewithin causing a peeling away of the peel-tab from the reservoir opening to release the processing fluid to the housing and the nozzle formed therein. As the tear-tab exits from the processing station housing, the aperture is sealed by a sealing arrangement provided proximate thereto.

The sealing arrangement of the present invention is configured to provide sealing for the aperture both prior to and following processing initiation. The sealing arrangement is selectively movable from a first sealing position to a second sealing position by movement of the tear-tab out of the processing housing. When in its first position, the sealing arrangement seals the processing housing from dust and the like prior to processing. In this manner, there will be no contamination of the processing station and especially the nozzle through which dust particles may pass and ruin portions of the film strip. When in its second position, having been moved there by the tear-tab, the sealing arrangement provides a seal at the aperture for preventing the accidental egress of processing fluid from the processing housing through the aperture to portions of the film handling cassette where it could cause irreparable damage to both the film strip and the individual elements located within the cassette.

Consequently, an important object and feature of the present invention is to provide an improved system for sealing a processing station aperture from processing fluid leakage subsequent to the initiation of processing of a strip of exposed photographic material.

Another object and feature of the present invention is to provide a film handling cassette having a processing fluid application system contained within a closed housing and an assembly for initiating the application which in part passes through an aperture formed in the housing and including an extremely effective means for selectively sealing the aperture both prior to and following the initiation of processing fluid application.

Still a further object and feature of this invention is to provide a sealing arrangement for a processing station aperture, the sealing arrangement being actuated by the same means which initiates the operation of the processing station.

Other objects and features of the present invention will in part be obvious and will in part become apparent from the detailed description to follow taken in conjunction with the accompanying drawings.

BRIEF DESCRIPTION OF THE DRAWINGS

The novel features that are considered characteristic of the invention are set forth with particularly in the appended claims. The invention itself, however, both as to its structure and its operation together with the additional objects and advantages thereof will best be understood from the following description of the preferred embodiment when read in connection with the accompanying drawings wherein:

DESCRIPTION OF THE PREFERRED EMBODIMENT

Figures 1, 2:
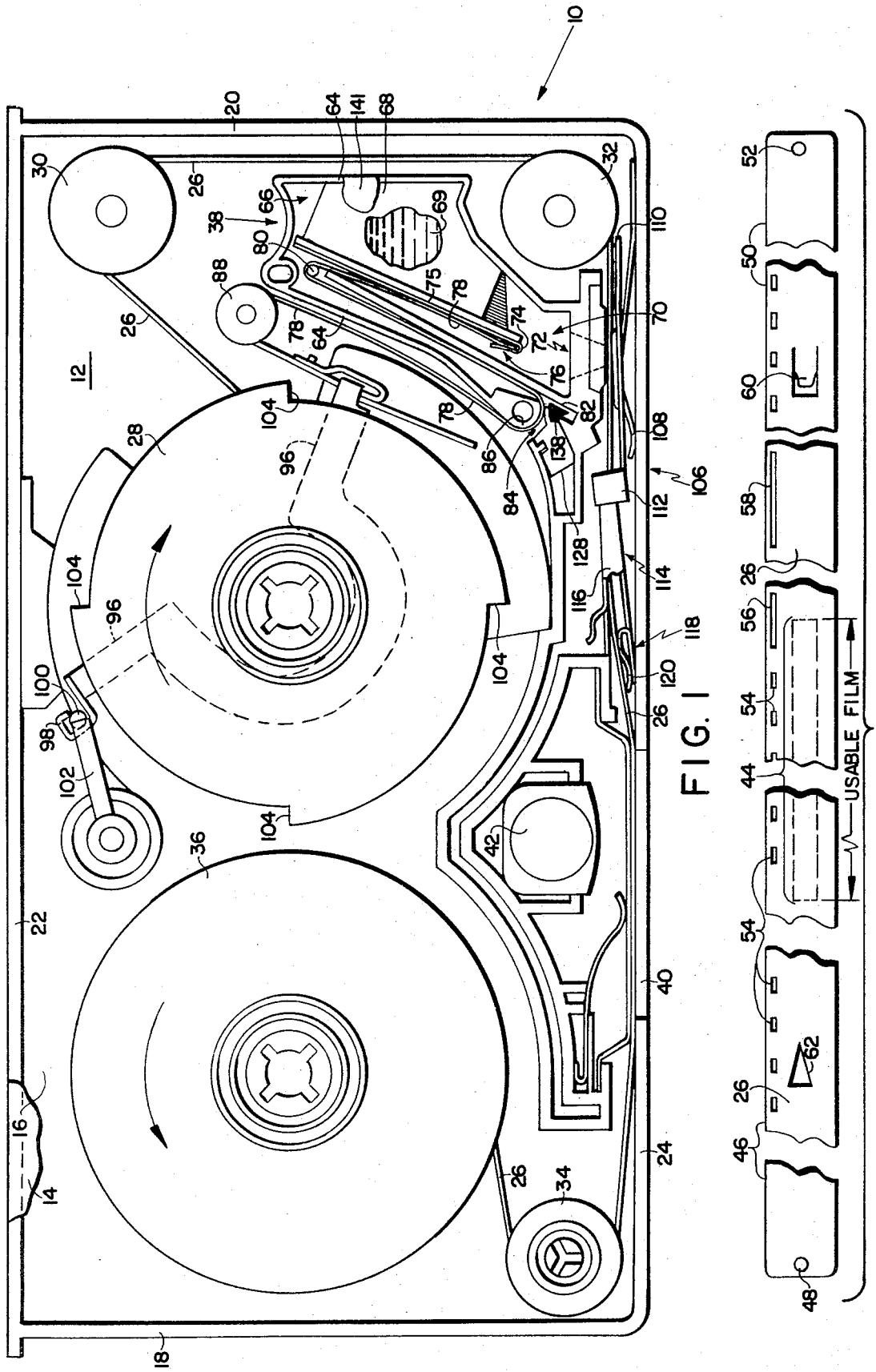
FIG. 1 is a diagrammatic plan view of a motion picture film handling cassette embodying the invention.
FIG. 2 is a fragmentary plan view of the film strip employed in the cassette shown in FIG. 1.

The illustrated embodiment of this invention, which may be best understood by first referring to FIG. 1 of the drawings, employs a multipurpose film handling cassette 10 of the type generally described in the above-mentioned patents. The cassette 10 is configured for substantially automatic processing of a film strip responsive to appropriate transport of the latter. In this regard, the cassette of the illustrated embodiment includes an applicator system, explained in detail below, which is operable in accordance with a particular film transport program controlled by a special projector or viewer (not shown). It should be understood, however, that while the invention disclosed herein is particularly applicable to the cassette of the type described in the same above-noted patents, it is not restricted to the same and may, of course, be applicable to any multipurpose film cassette.

As shown in FIG. 1, the cassette 10 comprises a generally parallelepiped casing or housing 12 constituted by planar faces or side walls 14 and 16, end walls 18 and 20, and elongated top and bottom edge walls 22 and 24. Carried within the housing 12 is a photographic film strip 26 which is permanently attached at one of its ends, as later explained in regard to FIG. 2, to a rotatable supply spool or reel 28 from which it extends within the housing 12 in an extended path around suitable rollers generally designated at 30, 32 and 34 to a take-up spool or reel 36 to which the opposite end of the film is attached. In its path within the housing 12, the film 26 extends across a normally inoperative film processing station 38, explained in detail below, and across an opening 40 which functions at different times to facilitate both exposure and projection. For facilitating the latter operation, a prism 42 is mounted behind the film strip 26 in an adjoining relation to both the opening 40 and to an illumination aperture (not shown) of the side wall 14. For a further understanding of the nature and operation of prism 42, reference should be made to patent application No. 214,591 of Philip G. Baker.

In order to fully understand the operation of the cassette 10, it is advantageous to look at the strip 26 which is utilized therein and is illustrated in FIG. 2 as viewed from the outer side of the film as shown in FIG. 1. Preferably, the film strip 26 comprises a base of any suitable transparent material carrying, at least over a photographically useful length 44, an emulsion or photosensitive coating of any conventional variety as, for example, an emulsion capable of being developed by a monobath processing composition to form a positive transparency suitable for projection. A currently preferred embodiment of the invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

A composite film assembly of this type, as well as processing compositions for producing a fully developed black and white image without the necessity of removing the developed negative image after processing is shown in prior U.S. Pat. No. 2,861,885 to Edwin H. Land, which issued on Nov. 25, 1958 for "Photographic processes and Products." Other composite film assemblies capable of producing developed full color images without the necessity of removing the developed emulsion are shown in prior patents of Edwin H. Land, U.S. Pat. No. 2,726,154, issued Dec. 6, 1955 for "Photographic Product," and U.S. Pat. No. 2,944,894, issued July 12, 1960 for "Photographic Process Utilizing Screen Members."

As shown in FIG. 2, the strip 26 includes a leader 46 terminating at an end formed with an aperture 48 which serves to connect that end of the film to the take-up spool 36. Behind the leader 46 is the strip 44 of photographically useful film upon which projectable images may be formed. Following portion 44 is a trailer region, generally designated at 50 which includes an aperture 52 by which end 50 of the film is connected to the supply spool 28. Located along one edge of the film strip 26 are a plurality of sprocket holes 54 which are configured for cooperation with a drive pawl (not shown) in either a camera or projector for incremental advancement of the film. Adjacent the trailing end 50, the series of sprocket holes 54 are interrupted by a first elongated sprocket hole 56 which may, for example, span two of the sprocket holes 54. Further, along the film in the direction of the supply reel end, the series of sprocket holes 54 is again interrupted by a second elongated hole 58, longer than the sprocket hole 56, and for example, spanning three of the sprocket holes 54.

The first elongated sprocket hole 56 terminates the advance of the film in the camera (not shown) and thereby establishes an exposure end point, whereas the second sprocket hole 58 determines a film take-up or projection end point in the projector apparatus (not shown). These different termination points are employed since it is preferred to advance the film beyond the exposure end point before applying processing composition to the exposed film, and for that purpose, a double film drive pawl (not shown) such that the film may be carried beyond the first elongated hole 56 until the second elongated hole 58 is encountered. This further advancement of the film in the projector unit is accomplished in order to bring a detent engaging element or projecting bump 60 into cooperative engagement with a pressure pad element of the processing station 38 as will be subsequently described. Additionally, the leader end 46 of the film strip 26 carries another detent engaging element, here shown as an aperture 62, which serves to actuate a valve member also forming a part of the processing station 38.

Referring again to FIG. 1, the film processing station 38 generally comprises a housing 64 having a first compartment 66 retaining a reservoir or pod 68 of processing fluid mounted over a second internal chamber 70 which communicates with a coating nozzle generally designated at 72. The fluid 69 which may, for example, be an aqueous alkaline solution such as is described in U.S. Pat. No. 2,861,885, is initially retained with the tub-like receptacle 68 by means of a peel-tab 74. The peel-tab 74 is in covering relationship with an opening 75 provided within one wall portion of reservoir 68 as indicated in a partial sectional view included in FIG. 5. When peeled, tab 74 permits the exit of the processing fluid 69 into compartment 70 and into nozzle 72 through which it is applied to film strip 26. Connected to peel-tab 74 as at 76 is a tear-tab 78 which extends from its connection with peel-tab 74 around a support pin 80 and wall section 82 toward and through an aperture 84 formed within housing 64. One edge 86 of aperture 84 is configured having a generally rounded shape for aiding in the exiting of tear-tab 78 from housing 64. The other end of tear-tab 78 extends around a roller 88 and is attached to an actuating assembly generally designated at 96. Actuating assembly 96 extends beneath the supply spool 28 to a hook-like end member 98 which is releasably latched to an upright post 100 and in engagement with a cam member 102. Upon insertion of the cassette 10 into the projector (not shown) the cam 102 is appropriately displaced by an applied signal or operation of a cassette-latching shaft (not shown) of the projector to drive the hook 98 from the post 100 and into engagement with one of four teeth 104 of the supply spool 28 under the urging of a spring (not shown). Then upon subsequent rotation of the spool in the rewind direction shown by the arrow in FIG. 1, the actuating assembly 96 is similarly rotated to move the tab 78 to cause the peel-tab 74 to peel away from covering relationship with the opening 75 of the receptacle 68 thereby releasing the fluid 69 to the nozzle 72.

Located beneath the exterior surface of the nozzle 72 is a pressure pad assembly 106, which is shown in FIG. 1 in the initial position assumed upon assembly of the cassette and prior to processing. As shown, the film strip 26 normally passes between the exterior of the nozzle surface and the pad assembly 106. The latter is mounted on and biased towards the nozzle surface by a leaf spring 108, and one end 110 of the pad 106 is configured to engage the base of the film 26 so as to cooperate with the protuberance 60 of the trailing end thereof.

Displaceably mounted in adjoining relationship to the other end 112 of the pressure pad assembly 106 is a sealing member or wedge-like, slide-valve 114 which is movable into selective sealing association with the exterior portion of nozzle 72. The valve 114 includes a substantially planar valve plate 116 formed with tapered sides which serve to guide the plate into juxtaposed relation beneath the nozzle 72 as the plate 116 is moved from left to right as seen in FIG. 1. Toward the left end of the plate 116 there is located an arm portion 118 extending substantially parallel to the plate. Integrally formed with the arm 118 is a spring arm extension 120 which engages the film 26 and is adapted to cooperate with the film aperture 62 of its trailing end so as to thereby displace the slide-valve 114 into its closed position at the completion of the initial rewind operation of the cassette.

Additionally provided on valve plate 116 in proper position for cooperation with the lower surface of the nozzle 72 is a piece of sealing material (not shown), configured to provide a contiguous, perimetric contact seal around and partially within the surrounding nozzle area and nozzle opening itself following the completion of the processing operation for preventing excess processing fluid from passing through nozzle 72 subsequent to processing.

With reference again to FIG. 1 of the drawings, it will be noted that the respective chambers 66 and 70 as well as the nozzle 72 are depicted as one major chamber in FIG. 1. In practice, the processing fluid handling functions served by the illustrated structure may be served equally well by separate chambers holding the pod 68 and the like.

As noted previously, the tear-tab 78 extends upwardly from its connection with peel-tab 74 as at 76 about pin 80. The securement of the tear-tab 78 to the peel-tab 74 is in lap joint fashion so that the tear-tab 78 initially lies within the reverse bend of the peel-tab 74, which is important in order to insure the proper separation of the two during one stage of the processing cycle.

Positioned proximate aperture 84, through which tear-tab 78 extends in its connection with actuating assembly 96, is a sealing member 128. Sealing member 128 is formed of a resilient rubber material such as that sold under the trademark "Kraton" by Shell Oil Co., which is characterized in being chemically inert when contacted by the processing fluid 69.

Figure 3:
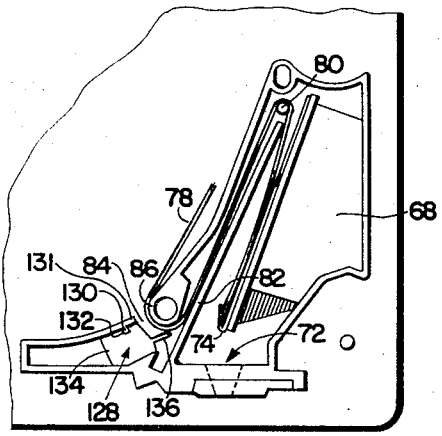
FIGS. 3, 4, 5, 6, and 7 are plan views of the processing station and its components during different phases of assembly and processing.

Looking to FIG. 3, there is shown the processing station during one stage of its assembly in which the sealing member 128 is initially placed within the processing housing 64. Sealing member 128 is retained within housing 64 in part by a vertically oriented key 130 which cooperates with a similarly shaped vertically oriented cut-out 132 formed in member 128. Member 128 includes a base portion 134 and a resilient tab or flap portion 136. When initially placed in housing 64, sealing member 128 is loosely fit within its confines and does not have any stresses or loads influencing it or its orientation therewithin. The non-stressed initial status of sealing member 128 facilitates its introduction within housing 64 during assembly. However, sealing member 128 is loaded and stressed during a subsequent stage of the processor housing assembly resulting in a positioning of base portion 134 and especially the flap portion 136 into an orientation best seen by referring to FIG. 4.

Figure 4:
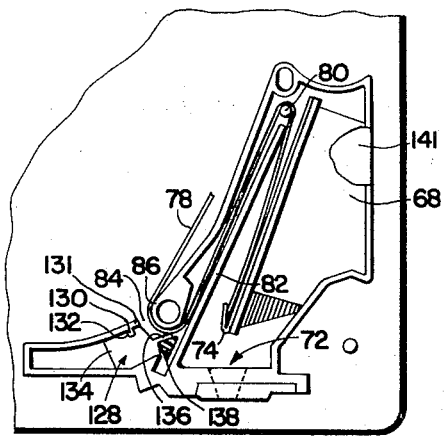

Sealing member 128 is loaded or stressed in a counterclockwise direction about its center by a support element 138 located on the interior of a cover portion 141 of housing 64. Cover portion 141 is fitted to the lateral sides of housing 64 to complete the film processing station. The aperture 84 is generally defined on two of its sides by side wall 16 and the oppositely facing cover 141. The third side of the generally square-shaped aperture 84 of the preferred embodiment is defined by rounded edge 86. The remaining side of aperture 84 is in part defined by a wall portion 131 of processing housing 64. This fourth side extends from wall portion 131 along base portion 134 to the flap member 136 when the sealing member 128 is placed in operative position within housing 64. Accordingly, the fourth side or edge of aperture 84 oppositely oriented from rounded edge 86 is generally formed by a wall comprised of portion 131 and a portion of base portion 134 of sealing member 128. Support element 138, located on cover portion 141, extends between cover 141 and side wall 16 and engages sealing member 128 as shown in FIG. 4. It should be noted that support element 138 may also be positioned within the bottom of the housing 64 on side wall 16. Moreover, the support element 138 may be formed as a portion of sealing member 128 represented as a second embodiment shown in FIG. 11.

Referring to FIG. 4, support element 138 provides a stress or load to sealing member 128 and its flap portion 136 such that the end of flap portion 136 is stressed into frictional engagement with tear-tab 78 as it passes around edge 86 of aperture 84. Tear-tab 78 is configured, in the preferred embodiment of the present invention, with a width less than the width of both flap 136 and edge 86. Accordingly, the portion of flap 136 which is not in frictional engagement with tear-tab 78 as it passes around edge 86 is in frictional engagement with edge 86. As a result, flap portion 136, in frictional engagement with portions of edge 86 and tear-tab 78, provides a sealing of the aperture 84 for preventing dust or dirt from entering the interior of processing station housing 64 prior to processing. The reasons for the desirability of such sealing before processing have been previously discussed and do not require reiteration. It is in this first position that sealing member 128 and its flap portion 136 are oriented prior to the initiation of processing.

Figure 5:
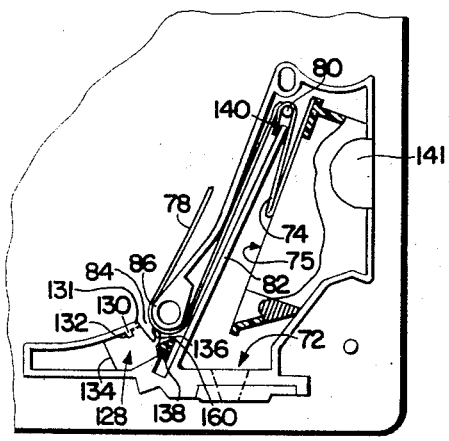

As shown in FIG. 5 of the drawings, the tear-tab 78 and peel-tab 74 have been moved from their initial positions in response to the initiation of processing by assembly 96 which has been "signaled" by the projector-viewer (not shown) to begin processing initiation. Peel-tab 74 is peeled away from its covering relationship with opening 75 of reservoir 68 to release the processing fluid 69 to chamber 70 and nozzle 72 for its application to film strip 26. Both peel-tab 74 and tear-tab 78 are pulled toward the exterior of housing 64 by asembly 96. One stage of this movement is shown in FIG. 5.

Figure 6:
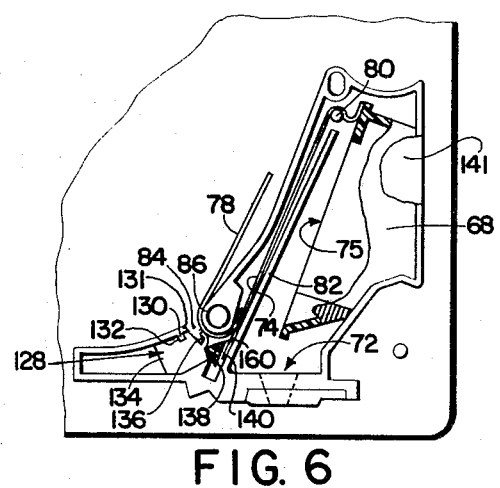
Figure 7:
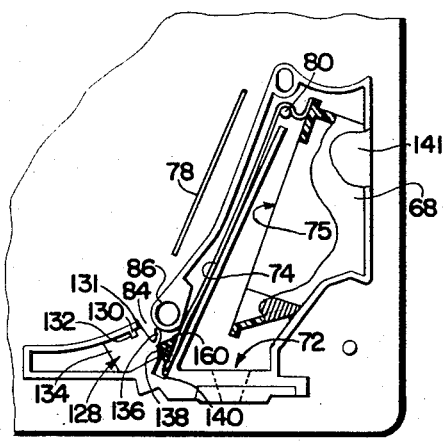
Figure 8:
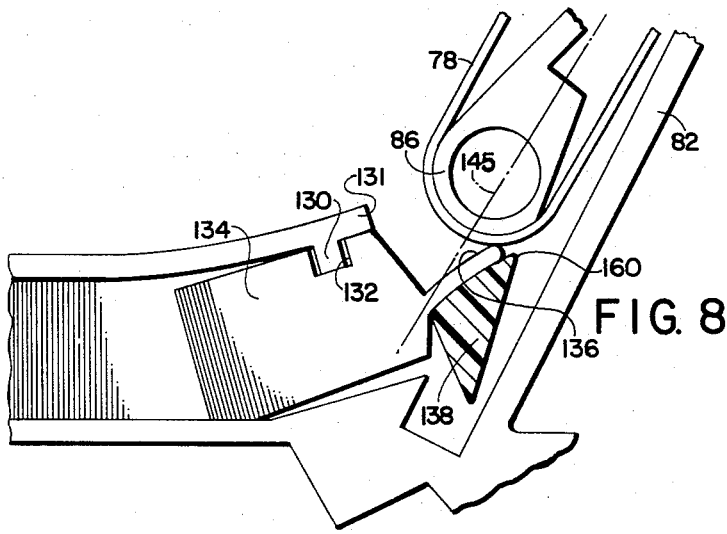
FIG. 8 is a detailed view of a portion of the apparatus of FIG. 1 prior to processing initiation.
Figure 9:
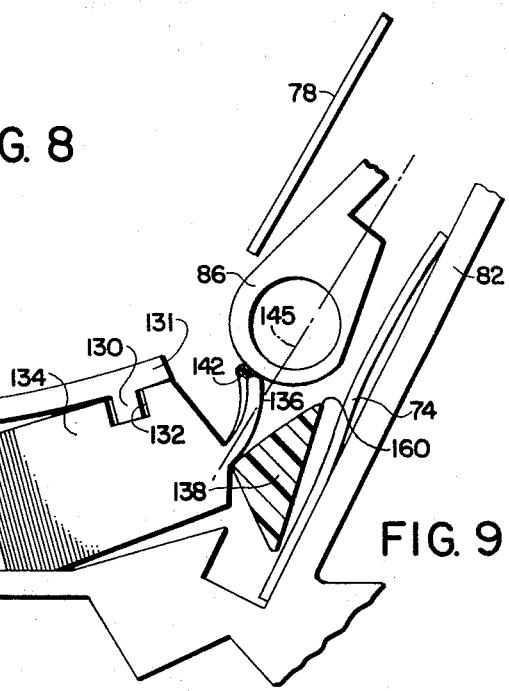
FIG. 9 is a detailed view of a portion of the apparatus of FIG. 1 subsequent to processing initiation.

Both peel-tab 74 and tear-tab 78 are moved by actuating assembly 96 to a position in which tabs 74 and 78 are separated from each other by support element 138. This position is best seen in FIG. 6 of the drawings. As shown therein, the relative orientation of rounded edge 86 and the support element 138, coupled with the nature of the lap joint connection of the tear-tab 78 to the peel-tab 74, will effect a separation of the tear-tab 78 from the peel-tab 74 as the former passes through aperture 84 as shown in FIG. 7. The leading edge 140 of the peel-tab 74 is unsealed from the tear-tab 78 for a short distance of approximately 1/16 inch, such that the leading edge 140 tends to open or move away from the tear-tab 78 as the latter turns around the rounded edge 86. In this regard, it will be noted that one edge 160 of support element 138 acts as a "knife blade" for effecting the above-noted separation. Once separated, peel-tab 74 remains within housing 64 while tear-tab 78 exits through aperture 84. It is during the movement of tear-tab 78 toward the exterior of housing 64 that the flap portion 136 of sealing member 128 is moved from its first position shown in FIG. 4 through a center line 145 of edge 86 to its second sealing position as shown in FIGS. 5, 6 and 7. FIG. 8 represents an enlarged detail of the sealing member in its first position on one side of center line 145 while FIG. 9 represents the same in its second position on the opposite side of center line 145. As may be evidenced from a detailed comparison of FIGS. 8 and 9, flap portion 136 is in a slightly curved orientation throughout in its first position (see FIG. 8). However, due to the relative sizes of tear-tab 78 and flap portion 136, the latter is removed from its slightly curved orientation when it is moved from its first position to its second position by tear-tab 78 (see FIG. 10) and frictionally engages rounded edge 86.

Figure 10:
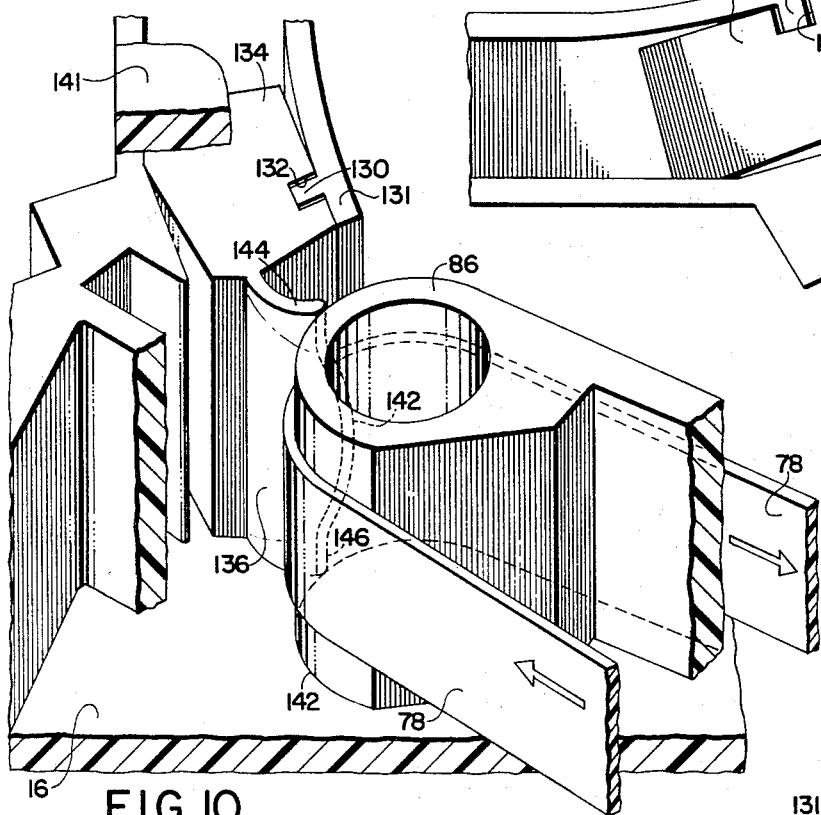
FIG. 10 is a detailed perspective view of the sealing apparatus of the present invention with certain elements removed in order to more clearly illustrate the salient details.

Movement of the flap portion 136 from its first position to its second position is caused by the displacement of tear-tab 78 toward the exterior of the processor housing 64. The specific configuration which flap portion 136 assumes when in its second position is primarily a result of the frictional engagement between portions of flap 136 and the boundaries of aperture 84. In particular, the width of flap portion 136 (in a vertical direction as seen in FIG. 10) is at least equal to and preferably greater in size than the interior distance between side wall 16 and cover 141. Consequently, the ends of flap 136 at top portion 144 and bottom portion 146 are in frictional engagement with cover 141 and side wall 16, respectively. In addition to being oversized in width, flap 136 is configured having a length which is greater than the distance it spans from base portion 134 to rounded edge 86. This horizontal oversizing (as seen in FIGS. 8 and 10) forces portions of flap 136 to bend slightly as the flap 136 extends between base portion 134 and rounded edge 86. As a result, the ends of top 144 and bottom 146 of flap portion 136 are forced into frictional engagement with rounded edge 86, central portion 142 being forced into frictional engagement with tear-tab 78.

The relocation of flap 136 into its second position is caused as a direct result of movement of tear-tab 78 toward the exterior of processor housing 64 during the commencement of the processing cycle. Central portion 142, in frictional engagement with tear-tab 78, is drawn along with tab 78 as the latter is moved toward the exterior of processor housing 64. The frictional engagement between the ends of the top portion 144 and the bottom portion 146 with cover 141 and side wall 16, respectively, and the additional engagement of portions 144 and 146 with rounded edge 86, causes a kinetic retardation of these portions during the movement of center portion 142 by tear-tab 78. Consequently, these portions, i.e., 144 and 146, are not moved to the extent that central portion 142 is as the latter is moved toward the exterior of aperture 84. Central portion 142, moved by tear-tab 78, is elastically stretched a given amount in its second sealing position against rounded edge 86. The stretching of the center portion of flap 136 causes a stress or load on the center portion which would move the center toward the interior of housing 64 were it not for its engagement with rounded edge 86. The extraction of tear-tab 78 from housing 64, in addition to providing an interiorly directed stress or load to the center portion 142 of flap 136, causes an oppositely directed stress or load to top and bottom portions 144 and 146, respectively. The equal and opposite loading of the portions is due to their kinetic retardation caused by their frictional engagement with cover 141, side wall 16, and rounded edge 86. The interiorly directed loading of portion 142 is substantially equal to but oppositely directed from the exteriorly directed stress or load on portions 146 and 144. Accordingly, the flap 136 of sealing member 128 is retained against the boundaries of aperture 84 in a stressed or loaded state. This results in a tighter fit between the boundaries and portions of flap 136 for providing a more efficient seal for aperture 84 than if the same portions were not loaded.

As noted previously, flap portion 136 is configured having a length which is greater than the distance it spans between base portion 134 and rounded edge 86 when it is in either its first or second position. As a result, the flap 136 must be compressed at least through some portions of its length in order to move from its first position (see FIG. 8) to its second fluid sealing position (see FIG. 9). The selective compression of the flap portion 136 as it is moved into its second position causes a biasing of the end of flap 136 into tighter engagement with rounded edge 86. Consequently, a more efficient aperture seal is provided.

To enable a more complete understanding of the novel unit, the overall operation of the system will now be explained. As previously indicated, upon insertion of the cassette 10 into a projector-viewer (not shown) following exposure of its film, a latching-shaft (not shown) enters the cassette and depresses the cam 102 thereby releasing the actuating assembly 96 into spool engagement. Then, the film 26 is driven slightly further forward by the double claw (not shown) so as to bring the film protuberance 60 into contact with the end 110 of the pad 106 and thereby displace the latter to the left from its initial position shown in FIG. 1. This permits the pad 106 to spring upwardly to its operative position (not shown) under the urging of the spring 108 and thereby carry the emulsion side of the film strip 26 into coating engagement with the nozzle 72. Thereafter, upon initiation of film rewind, and hence, clockwise rotation of the film spool 28, the tab 74 is peeled from the fluid receptacle 68 so as to release the fluid 69. The latter flows to the nozzle opening 72 and through it to the film strip 26 such that a thin layer of processing fluid is deposited on the film during the rewind operation. When the film strip 26 is substantially completely rewound onto the supply reel 28, the aperture 62 engages the arm 120 of the valve 114 and displaces the latter to the right as shown in FIG. 1 and across the nozzle opening 72 to its closed position (not shown).

Tear-tab 78 and peel-tab 74 are moved toward aperture 84 around pin 80 by actuating assembly 96 until the junction of tabs 74 and 78 engages support element 138. The leading edge 160 of support element 138 functions as a knife blade for causing the separation of the two tabs. The two tabs are separated, tab 74 remaining within the housing 64 while 78 is removed therefrom. During the processing initiation movement of tear-tab 78, the sealing member 128 is moved from its first sealing position to its second sealing position for insuring that no excess processing fluid will pass around wall 82 and exit housing 64 through aperture 84. The seal remains in its second sealing position and does not move from that position thereafter.

Figure 11:
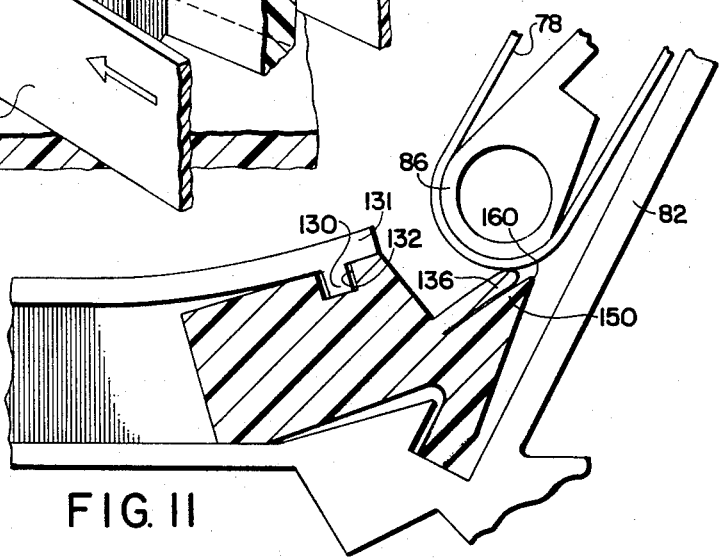
FIG. 11 is a plan view of a second embodiment of the present invention.

As previously indicated, support element 138 may be formed integrally with sealing member 128. A sealing member in accordance with such a second embodiment of the present invention is shown in FIG. 11. Specifically, a hard, rigid material attachment is made proximate flap portion 136 which not only serves to bias or load flap portion 136 into frictional engagement with tear-tab 78 and rounded edge 86 but, also includes a knife-like edge 150 which separates tear-tab 78 from peel-tab 74 during processing initiation.

It will be seen that by this invention there is provided an improved photographic cassette and fluid processing station which efficiently treats photographic film following its exposure; and includes a sealing member for effectively sealing a portion of the processing station subsequent to processing initiation. An effecient sealing member is movable from a first sealing position to a second sealing position by a member which in part initiates the processing of the photographic film and which forms a permanent seal of the processing station is provided.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A film handling cassette comprising:
   a cassette housing configured to retain a strip of photographic film; and
   processing means for treating said film strip with processing fluid, said processing means including:
   a processor housing, said housing including means defining an aperture in an outer wall thereof;
   a reservoir located within said processor housing for retaining a quantity of processing fluid;
   selectively operable means for releasing such processing fluid from said reservoir for deposit on said film strip, said selectively operable means including an elongated member extending through said aperture and exteriorly of said processor housing, said elongated member being configured for displacement relative to said aperture to release such processing fluid within said processing housing; and
   sealing means mounted proximate said aperture, said sealing means including means movable into a fluid sealing position relative to said aperture responsive to displacement of said elongated member to release such fluid so as to prevent exiting of such fluid through said aperture following release of such fluid.

2. The film handling cassette of claim 1 wherein said movable means of said sealing means is movable, in response to said displacement of said elongated member, between a first position wherein said movable means precludes entry of extraneous material to said processor housing and said fluid sealing position wherein said movable means precludes exiting of such fluid from said processor housing through said aperture.

3. The film handling cassette of claim 1 wherein said elongated member is configured for withdrawal from said processor housing for release of such fluid, said sealing means comprising a base portion having said movable means attached thereto, said movable means being configured as a flexible flap member located interiorly of said processor housing and configured to be displaced into sealing arrangement with said aperture as said elongated member is withdrawn from said processor housing.

4. The film handling cassette of claim 3 wherein said base portion of said sealing means is in sealing relationship with one edge of said aperture and said flexible flap member is configured for movement into sealing engagement with select portions of the opposite edge of said aperture responsive to the displacement of said elongated member to release such fluid.

5. The film handling cassette of claim 1 wherein said movable means is positioned in the path of displacement of said elongated member, said elongated member being displaced through said aperture, said movable means being movable from a first sealing position prior to displacement of said elongated member into said fluid sealing position when said elongated member is displaced through said aperture.

6. The film handling cassette of claim 1 wherein said processing means includes support means, said support means being configured to bias said movable means of said sealing means into frictional engagement with said elongated member proximate said means defining said aperture prior to the displacement of said elongated member.

7. The film handling cassette of claim 6 wherein said movable means of said sealing means is configured as a flexible and deformable flap member, the displacement of said elongated member relative to said aperture causing the flexing and deformation of said flap member as said flap member is moved into said fluid sealing position relative to said aperture.

8. The film handling cassette of claim 6 wherein said elongated member is configured for withdrawal from said processor housing for release of such fluid, said support means being configured to bias said movable means of said sealing means in the direction of withdrawal of said elongated member for aiding in the movement of said movable means in said direction of withdrawal when said elongated member is withdrawn from said housing.

9. The film handling cassette of claim 1 wherein said selectively operable means includes a peel strip in covering relation with an opening formed in said reservoir, said peel strip being connected to said elongated member for displacement out of said covering relation with said opening in said reservoir to release such fluid into said processing housing when said elongated member is displaced, said peel strip being servable from said elongated member during a portion of the displacement of said elongated member by a portion of said support means.

10. The film handling cassette of claim 9 wherein said support means is formed as a portion of said housing within the path of displacement of the connection between said elongated member and said peel strip.

11. The film handling cassette of claim 9 wherein said support means is formed as a portion of said sealing means within the path of displacement of the connection between said elongated member and said peel strip.

12. The film handling cassette of claim 1 wherein said movable means of said sealing means is movable from a first position, in which said movable means is biased into frictional engagement with said elongated member, to said fluid sealing position, in which substantially all of said movable means is in frictional engagment with a portion of said means defining said aperture, said movable means having one portion loaded in one direction against one edge of said aperture and at least another portion substantially equally loaded in substantially the opposite direction from said one direction against said one edge of said aperture when said movable means is in said fluid sealing position.

13. The film handling cassette of claim 12 wherein said sealing means includes a base portion, statically positioned in sealing association with an edge opposite said one edge of said aperture, and said movable means is configured as a flexible flap member of a given width in selectively engageable position with said one edge of said aperture, said flap member being movable in response to the withdrawal of said elongated member from said processor housing, said elongated member having a width smaller than said given width of said flap member for loading said one portion of said flap member in said one direction against said one edge of said aperture when said elongated member is withdrawn, said means defining said aperture causing an equal but oppositely directed loading against said one edge of said aperture to the remainder of said flap member engageable with said one edge.

14. The film handling cassette of claim 13 wherein said elongated member is configured to engage a central portion intermediate the margins of one edge of said flap member and to load said central portion in a direction opposite said one direction when said elongated member is withdrawn from said processor housing, the margins of said one edge of said flap member being equally but oppositely loaded from said central portion against said one edge of said aperture for providing a static retention of said flap member at its fluid sealing position.

15. The film handling cassette of claim 13 wherein said means defining said aperture includes said one edge and said opposite edge and two oppositely oriented wall portions of said processor housing, said two oppositely oriented wall portions being separated from each other a given distance equal to or less than said given width of said flap member, given portions of said flap member being configured so as to be in frictional engagement with said two oppositely oriented wall portions when said flap member is in both said first position and in said fluid sealing position.

16. The film handling cassette of claim 15 wherein said flap member is configured of said given width and of a given flexibility such that said given portions of said flap member in frictional engagement with said two wall portions are kinetically retarded against said two wall portions when said flap member is moved, resulting in a loading of said given portions of said flap member against two wall portions in a direction opposite said one direction.

17. The film handling cassette of claim 1 wherein said sealing means is provided within said processor housing, said sealing means remaining within said processor housing when in both said first position and said fluid sealing position.

18. The film handling cassette of claim 1 in which said movable means is movable from a first position, in which a portion of said movable means is in frictional engagement with said elongated member, the remainder of said movable means being in frictional engagement with substantially all of said means defining said aperture, to said fluid sealing position in which said movable means is in a loaded condition with said means defining said aperture, said portion of said movable means in frictional engagement with said elongated member being moved by said elongated member during its displacement further away from said first position into said fluid sealing position than the remainder of said movable means in frictional engagement with substantially all of said means defining said aperture, said frictional engagement between said remainder of said movable means and substantially all of said means defining said aperture providing a retardation of the movement of said movable means not in engagement with said elongated member.

19. The film handling cassette of claim 18 wherein said elongated member is configured for withdrawal from said processor housing for release of such fluid, said sealing means including a base portion having said movable means attached thereto, said movable means being configured as a flexible flap member movable from said first position to said fluid sealing position in response to the withdrawal of said elongated member from said processor housing, said portion of said flap member in frictional engagement with said elongated member being configured to be moved further in the direction of withdrawal of said elongated member than the remainder of said flap member for loading said portion of said flap member against one edge of said means defining said aperture in a direction opposite said direction of withdrawal, said remainder of said flap member being loaded against the remainder of said means defining said aperture co-directionally with said direction of withdrawal due to said frictional engagement between said remainder of said flap member with said means defining said aperture.

20. The film handling cassette of claim 19 wherein said flap member is configured having a given length and a given width, said means defining said aperture including said one edge and an opposite edge sealably engaged by said base portion of said sealing means, and two oppositely oriented wall portions engaged by select lateral portions of said flap member, said one edge and said opposite edge being separated a given distance less than said given flap member length and said two oppositely oriented wall portions being separated a given distance less than said given flap member width, said flap member being selectively compressed when in said first position and when in said fluid sealing position.

21. The film handling cassette of claim 1 in which said elongated member is configured for withdrawal from said processor housing through said aperture in a given direction to release such processing fluid, said sealing means including means for resiliently biasing said movable means into engagement with said elongated member so that said movable means is displaced in said given direction along with said elongated member as said elongated member is withdrawn from said processor housing.

22. The film handling cassette of claim 1 in which said movable means is carried by said elongated member into its fluid sealing position by said elongated member when said elongated member is displaced.

23. The film handling cassette of claim 1 in which said movable means is configured as a resilient and deformable flap member movable into a fluid sealing position relative to said aperture.

24. The film handling cassette of claim 23 in which said elongated member is configured to be withdrawn from said processor housing to release such fluid, said flap member being configured having a substantially static end and one end movable between a first position in which it cooperates with a portion of one edge of said aperture and a second position in which it cooperates with another portion of said one aperture edge, said flap member being movable between said first and said second positions in response to the withdrawal of said elongated member from said processor housing, said movable end of said flap member being configured for movement past a given point on said one aperture edge between said first and second positions, said flap member having a length from said static end to said movable end greater than the distance between said static end and said given point on said one aperture edge, and the distance from said static end to said one portion of said aperture edge and the distance from said static end to said another portion of said one aperture edge each being greater than the distance between said static end and said given point, so that said flap member is selectively compressed during its movement past said given point as said flap member is moved between said first and second positions.

25. The film handling cassette of claim 1 in which said movable means is configured as a resilient flap member, said processor housing including means formed as a part thereof for selectively restraining select borders of said flap member during its movement in response to the displacement of said elongated member and for providing a curvilinear contact of said flap member with select portions of said means defining said aperture, whereby a more efficient sealing of said aperture is provided.

26. An applicator for depositing a layer of processing fluid on an exposed strip of photographic film, said applicator including a housing, said housing including means defining an aperture formed in an outer wall thereof, means within said housing for releasably retaining a quantity of such processing fluid, means defining an opening in said housing for delivering such processing fluid to such film strip upon the release of such fluid from said retaining means, selectively operable means for releasing such processing fluid from said reservoir for deposit on such film strip, said selectively operable means including an elongated member extending through said aperture and exteriorly of said housing, said elongated member being configured for displacement relative to said aperture to release such processing fluid within said housing, and sealing means, mounted proximate said aperture, said sealing means including means movable into a fluid sealing position relative to said aperture, responsive to displacement of said elongated member to release such fluid, so as to prevent exiting of such fluid through said aperture following release of such fluid.

27. A system for advancing and treating a strip of photographic film with processing fluid, said system comprising:
- a housing configured to retain a strip of photographic film;
- means, when driven, for selectively advancing said strip of photographic film within said cassette housing; and
- processing means for treating said film strip with processing fluid as said film strip is advanced, said processing means including:
  - a processor housing, said housing including means defining an aperture in an outer wall thereof;
  - a reservoir located within said processor housing for retaining a quantity of processing fluid;
  - selectively operable means for releasing said processing fluid from said reservoir for deposit on said film strip when said film strip is advanced, said selectively operable means including an elongated member extending through said aperture and exteriorly of said processor housing, said elongated member being configured for displacement relative to said aperture to release said processing fluid within said processor housing; and
  - sealing means mounted proximate said aperture, said sealing means including means movable into a fluid sealing position relative to said aperture, responsive to displacement of said elongated member to release said fluid, so as to prevent exiting of said fluid through said aperture following release of said fluid.

* * * * *